United States Patent [19]

Lodoen

[11] Patent Number: 4,837,292

[45] Date of Patent: Jun. 6, 1989

[54] ARTICLE OF SPANDEX HAVING POLYCARBONATE SOFT SEGMENT

[75] Inventor: Gary A. Lodoen, Fisherville, Va.

[73] Assignee: E. I. DuPont De Nemours and Company, Wilmington, Del.

[21] Appl. No.: 134,022

[22] Filed: Dec. 17, 1987

[51] Int. Cl.$^4$ .................. C08G 18/10; C08G 18/34
[52] U.S. Cl. ............................... 528/63; 528/64; 57/243
[58] Field of Search .................. 528/62, 63, 64

[56] References Cited

U.S. PATENT DOCUMENTS

| | | | |
|---|---|---|---|
| Re. 29,224 | 5/1977 | Pedain et al. | 528/62 |
| 3,379,683 | 4/1968 | Booth | 528/64 |
| 3,481,905 | 12/1969 | Wieden et al. | 528/64 |
| 3,507,834 | 4/1970 | Wittbecker | 528/64 |
| 3,509,233 | 4/1970 | Müller et al. | 260/858 |
| 3,542,736 | 11/1970 | Rausch et al. | 528/64 |
| 3,639,354 | 1/1972 | M/ller et al. | 260/77.5 |
| 3,642,703 | 2/1972 | Suzuki et al. | 528/64 |
| 3,655,623 | 4/1972 | Martin | 528/64 |
| 3,658,746 | 4/1972 | Rosendahl et al. | 260/30.8 |
| 3,867,350 | 2/1975 | Pedain et al. | 528/64 |
| 3,900,688 | 8/1975 | Thoma et al. | 528/64 |
| 3,994,881 | 11/1976 | Altau et al. | 260/75 |
| 4,131,731 | 12/1978 | Lai et al. | 528/370 |
| 4,423,205 | 12/1983 | Rajan | 528/371 |
| 4,456,745 | 6/1984 | Rajan | 528/85 |

*Primary Examiner*—John Kight
*Assistant Examiner*—Dennis R. Daley

[57] ABSTRACT

A shaped article of a polyurethane-urea spandex having a specific polycarbonate soft segments provides improved resistance to chlorine and mildew. The soft segment is derived from poly(pentane-1,5-carbonate)-diol, poly(hexane-1,6-carbonate)diol, copolymers thereof, or mixtures thereof.

4 Claims, No Drawings

ARTICLE OF SPANDEX HAVING POLYCARBONATE SOFT SEGMENT

BACKGROUND OF THE INVENTION

1. Field of the Invention

This invention relates to an improved shaped article made of a spandex polymer which contains polycarbonate soft segments. In particular, it relates to such an article made of a linear, segmented polyurethane-urea spandex polymer that has particular polycarbonate soft segments which impart improved chlorine and mildew resistance to the article.

2. Description of the Prior Art

Shaped articles, such as fibers and films, of spandex polymers are well known. Most commercial spandex polymers have "soft segments" of polyethers or polyesters. When these types of polymers are used for filaments that are incorporated into swimwear fabrics, the fabrics generally need improvement in resistance to degradation by swimming-pool chlorine. Such fabrics made with commercial polyester-based spandex filaments usually also need improvement in resistance to mildew.

Various polycarbonates have been disclosed for use in polyurethane polymers. However, these disclosures do not concern the chlorine and/or mildew resistance problems of spandex articles. For example, Lai et al, U.S. Pat. No. 4,131,731, discloses linear polycarbonates having terminal hydroxyl groups as being useful for reaction with organic isocyanates to form polyurethanes intended for coating materials. Rajan, U.S. Pats. No. 4,423,205 and 4,456,745, disclose polyurethane polymer made by reaction injection molding (RIM) techniques from the reaction product of (a) a polycarbonate glycol formed by heating a cyclic carbonate in the presence of a cationic initiator, (b) an organic polyisocyanate and (c) an organic chain extender having two isocyanate-reactive hydrogens. The polymer is reported to have good hydrolytic stability. Note that the aromatic diamines suggested by Rajan for the chain extension generally would be inadequate for commercial spandex filaments because of their very slow reaction with the isocyanates.

Muller et al, U.S. Pat. No. 3,509,233, discloses good hydrolytic stability for cross-linked or cross-linkable polyurethane elastomers which include polycarbonates based on 1,6-hexane diol and alkoxylated 1,6-hexane diol. Muller et al, U.S. Pat. No. 3,639,354, further discloses polyurethanes made with polycarbonates.

Semicarbazidoamines have been disclosed as chain extenders. For example, Rosendahl et al, U.S. Pat. No. 3,658,746, discloses such chain extenders for forming segmented polyurethanes in which the soft segment is a poly(hexane-1,6-carbonate). However, such polymers are known to discolor.

U.S. Pat. No. 3,994,881, Altau et al, discloses polyester polyurethane-urea spandex filaments having improved resistance to degradation by ultraviolet radiation and chlorine-containing bleaches, in which the hard segments contain ureylene groups which are joined to "functionally non-aromatic" radicals, at least 25 mol percent of which are of the formula

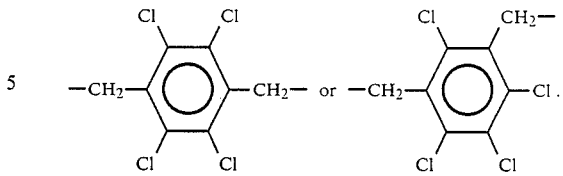

The polymers are prepared from a polyester glycol, tetra-halogenated diisocyanates and tetra-halogenated diamines.

An object of this invention is to provide a shaped article of spandex having improved resistance to degradation caused by chlorine and/or mildew.

SUMMARY OF THE INVENTION

The present invention is an improved shaped article of a linear, segmented polyurethane-urea spandex polymer which is particularly suited for use in environments requiring chlorine and mildew resistance (e.g., in swimwear). The shaped article is preferably a fiber or a film. The spandex polymer is of the type that is produced by reacting a hydroxyl-terminated polymer with an organic diisocyanate to form an isocyanate-terminated polymer, which is then chain extended with a diamine. The improvement comprises, in combination, the hydroxyl-terminated polymer being a polycarbonate selected from the group consisting of poly(pentane-1,5-carbonate)diol, poly(hexane-1,6-carbonate)diol, copolymers thereof and mixtures thereof, the organic diisocyanate being selected from the group consisting of p,p'-methylene diphenyl diisocyanate, 4,4'-methylene-bis(cyclohexylisocyanate), $\alpha,\alpha,\alpha',\alpha'$-tetramethyl p-xylylene diisocyanate, $\alpha,\alpha,\alpha',\alpha'$-tetramethyl m-xylylene diisocyanate and mixtures thereof and the chain-extending aliphatic diamine being selected from the group consisting of hydrazine and diamines of the formula $H_2N-R-NH_2$, wherein R has 2 to 8 carbon atoms and is an alkylene group, an alicyclic group, a tetra-chloro-substituted xylylene group and mixtures thereof.

DETAILED DESCRIPTION OF PREFERRED EMBODIMENTS

As used herein, the term "spandex" has its usual definition; that is, a long chain synthetic polymer that comprises at least 85% by weight segmented polyurethane. The terms "soft segment" and "hard segment" refer to specific portions of the spandex polymer chains. The soft segments are the polycarbonate portions of the segmented polyurethane-urea polymer and the hard segments refer to the portions of the polymer chains that are derived from the reaction of an organic diisocyanate with a diamine chain extender. The isocyanate end group content of a polymer may be referred to as the NCO content.

In accordance with the improvement of the present invention, the poly(pentane-1,5-carbonate)diol, the poly(hexane-1,6-carbonate)diol, or copolymers or mixtures thereof, used for preparing the spandex polymer from which the shaped article of the present invention is formed, generally has a number average molecular weight in the range of 800 to 5,000 and a melting point of no higher than 50° C. Preferably, the polycarbonate diol has a molecular weight in the range of 1,700 to 3,000, and most preferably in the range of 2,200 to 2,700.

To prepare the spandex polymer for the shaped article of the invention, the above-described polycarbonate diol is reacted (or "capped", as it is sometimes referred to) in a conventional manner with an excess of an organic diisocyanate to form an isocyanate-terminated polycarbonate which is then chain extended with a diamine.

Although a key feature of the spandex polymer for use in the present invention is the soft segments of the above-recited polycarbonate units, a small portion (e.g., as much as 15%) of other aliphatic diols can be copolymerized therewith, so long as the aliphatic diols do not detrimentally affect the tensile and elastic properties to the resultant spandex polymer or its resistance to chlorine, mildew, hydrolysis and ultra-violet light.

Of the group of organic diisocyanates which are listed above for use in preparing a spandex article of the invention, the $\alpha,\alpha,\alpha',\alpha'$-tetramethyl xylylene diisocyanates are preferred for providing polymers that have the extra resistance to chlorine degradation. The capping reaction preferably is carried out so that the isocyanate end-group content (i.e., NCO content) of the capped polymer is in the range of 2.3 to 3.3 weight percent, most preferably in the range of 2.4 to 3.1%. The preferred ranges of NCO content result in a preferred combination of elastic properties in the final spandex article as well as increased resistance to chlorine and mildew.

Of the chain-extending diamines which are listed above for use in preparing the spandex polymer of the invention, preferred chain-extending diamines are selected from ethylenediamine, hydrogenated m-phenylenediamine, hydrogenated p-phenylenediamine, tetra-chloro-m-phenylenediamine, tetra-chloro-p-phenylenediamine and mixtures thereof. Particularly preferred is a mixture of ethylenediamine and hydrogenated m-phenylenediamine, wherein the ethylenediamine amounts to at least 70% by weight of the mixture.

The reactions used for preparing the spandex polymer generally are carried out in an inert solvent, such as dimethylacetamide, dimethylformamide or the like. Preferred forms of the shaped spandex article of the invention are fibers and films. These can be made by conventional wet spinning, extrusion or casting techniques. For example, the polymer can be dry spun into filaments from the same solvent as was used for the polymerization. The filaments can then be heat set, usually by holding the filaments for 2 to 10 minutes at 145 to 165° C. while extended to 1.5 to 3.5 times their original length and then immersing them in boiling water in a relaxed condition for at least 20 minutes. Higher setting temperatures for shorter times (e.g., at 195° C. for 30 seconds) sometimes can be employed satisfactorily.

The spandex articles of the invention have unexpectedly good resistance to mildew. In addition, the articles resist degradation due to swimming-pool chlorine, have excellent hydraulic stability especially in acid environments, good oxidative and thermal stability, and satisfactory elastic and tensile properties. Accordingly, shaped articles of the invention are particularly suited for use in swimwear fabrics, swim goggles and the like.

The following test procedures were used in the Examples and Comparisons below for measuring various parameters and properties of the prepared spandex fibers or films.

The molecular weights reported herein are number average molecular weights of the polyester diols. Each was determined from the hydroxyl number of the polyester diol, which was measured by the imideazole-pyridine catalyst method described by S. L. Wellon et al, "Determination of Hydroxyl Content of Polyurethane Polyols and Other Alcohols", *Analytical Chemistry*, Vol. 52, No. 8, pp. 1374–1376 (July 1980).

The NCO content of isocyanate-capped polycarbonate was measured by the method of S. Siggia, "Quantitative Organic Analysis via Functional Group", 3rd Edition, Wiley & Sons, New York, pages 559–561 (1963).

Strength and elastic properties of the spandex filaments were measured in accordance with the general method of ASTM D 2731-2772. Three filaments, a 2-inch (5-cm) gauge length and a zero-to-300% elongation cycle were used for each of the measurements. "Power" is the stress at an elongation of 100%. The samples were cycles five times at an constant elongation rate of 800% per minute and then held at the 300% extension for half a minute after the fifth extension. Then the percent elongation and tenacity (in grams per denier) at break were measured on the sixth extension cycle.

Resistance to attack by chlorine, or "chlorine durability" was determined by measuring the loss of power in a spandex yarn when exposed to conditions which correlate with those encountered in a swimming-pool environment. A test sample, made up of a sufficient number of filaments or strips to provide the sample with a retractive power of about 100 grams when extended to 150% of its original length, is clamped relaxed at two places along the sample to provide a 10-cm exposed length. The sample is then stretched to 14 cm and immersed in a water bath maintained at a temperature of 30° C., at a pH of 7.5 by addition of hydrochloric acid, and at an active chlorine concentration of 3 parts per million by addition of sodium hypochlorite solution. At the start of the test and every 24 hours thereafter, 1.9 ppm of urea (based on weight of water) is added to the bath simulate the effect of nitrogen compounds found in swimming pools. This maintains the chloramine concentration (measured as the difference between free and total chlorine) at 0.2 to 0.5 ppm. The sample has one of its clamped ends attached to a load cell which cyclically elongates the exposed length of sample from 10 to 14 cm at a frequency of 0.3 Hz. The power of the sample is measured every 20 minutes. Failure time is defined as the time required for a sample to lose 40% of its original power. For each determination, a commercial spandex yarn of the type described below in Example 1 (Control A) is exposed and tested simultaneously with and in the same manner as the test sample. Nine test samples are used for each determination. The chlorine durability is defined as the average failure time for the nine samples divided by the average failure time of the control sample.

Resistance to attack by mildew was measured by the general method of ASTM D-1924-70. An aqueous dispersion of aspergillus niger spores was employed. The test was performed on single-knit (four feed hosiery machine) hosiery panty fabric made with 50-denier, 17 filament nylon as companion fibers to the spandex test filaments. The spandex filaments were knitted in every fourth course without plaiting with the nylon. Before mildew testing, the fabric was washed with one half cup of laundry detergent in a home laundry washing machine set for a normal wash and rinse cycle, followed by drying in a home laundry dryer set for a permapress cycle. Square samples of the fabric measuring 3 inches (7.6 cm) on each side were then fastened under light tension over cylindrical polystyrene dishes. The samples were then innoculated with the aqueous spore dispersion. Days to first failure were then measured. Failure was recorded as the time at which a hole was evident in the fabric sample. In each test, a similar control fabric made with commercial polyester-based spandex filaments (Type-128 "LYCRA" spandex, sold by E. I. du Pont de Nemours & Co.) was exposed under the same conditions. The polymer of the commercial yarn was formed from a 3,400-molecular-weight polyester glycol derived from the reaction of a 60/40 ethylene glycol/1,4-butanediol mixture with adipic acid and then capped with methylene-bis(4-phenylisocyanate) and extended with ethylene diamine. Hereinafter, this polymer is also referred to as 2G/4G-6:MDI:EDA. Fabrics made with commercial filaments of this polyester-based spandex polymer exhibited an average of two days until first failure in the mildew durability test.

In the examples set forth hereinafter, the following abbreviations are used for the listed chemical material:

| | |
|---|---|
| poly(pentane-1,5-carbonate)diol | 5G-1 |
| poly(hexane-1,6-carbonate)diol | 6G-1 |
| 4,4'-methylene-bis(cyclohexylisocyanate) | PICM |
| p,p'-methylene diphenyl diisocyanate | MDI |
| methylene-bis(4-phenylisocyanate) | MDI |
| α,α,α',α'-tetramethyl p-xylylene diisocyanate | p-TMXDI |
| α,α,α',α'-tetramethyl m-xylene diisocyanate | m-TMXDI |
| ethylenediamine | EDA |
| hydrogenated m-phenylenediamine | HmPD |
| hydogenated p-phenylenediamine | HpPD |
| tetrachloro-m-xylylenediamine | TClmXD |
| tetrachloro-p-xylylenediamine | TClpXD |
| tetrachloro-m-xylylenediisocyanate | TClmXDI |
| tetrachloro-p-xylylenediisocyanate | TClpXDI |
| diethylamine | DEA |
| N,N—dimethylacetamide | DMAc |
| 1,1-bis(2-methyl-4-hydroxy-5-t-butylphenyl)butane | SWP |

Chemical compositions of the spandex polymers illustrated in the examples also is abbreviated. The repeating units of the polymer are separated by colons. That is, the soft segment, the diisocyanate and the diamine portions are separated by colons. A commercial spandex polymer made from polytetramethyleneether glycol (PO4G), p,p'-methylene diphenyl diisocyanate (MDI) and a mixture of ethylene diamine (EDA) and hydrogenated m-phenylenediamine (HmPD) is therefore abbreviated as PO4G:MDI:EDA/HmPD, and the commercial polyester-based spandex, Type-128 "Lycra" mentioned above, is abbreviated as 2G/4G-6:MDI:EDA. In the following examples, 5G-1 and 6G-1 polycarbonate diol starting materials were produced by the following procedure. In the preparation of 5G-1, 2400 grams (23.0 moles) of purified 1,5-pentanediol and 2400 grams (27.0 moles) of purified ethylene carbonate were placed in a 5-liter vessel that was fitted with a stirrer, a nitrogen inlet line, a thermometer and a fractionating column. The contents of the vessel were heated to 140°-150° C. under a nitrogen sweep for one hour. Then 90 microliters of "Tyzor" TPT (isopropyl alcohol ester of orthotitanic acid, a catalyst sold by E. I. du Pont de Nemours & Co.) were added, a partial vacuum of 100 mm of Hg was established in the vessel, and the temperature of its contents was raised slowly to 190° C. A total of 1,333 grams of distillate was removed. The vessel was then cooled to below 140° C. and a vacuum of about one mm of Hg was established. Heating was resumed to raise the temperature to 190° C. Another 795 grams of distillate was removed. The vessel was cooled and the fractionating column removed. A 1-mm Hg vacuum was then reestablished in the vessel, the temperature was raised slowly to 195° C. and an additional 129 grams of distillate was removed. The 5G-1 polycarbonate diol remaining in the vessel at that time had a number average molecular weight of 1314. After further heating and removing an additional 35.3 grams of distillate, the molecular weight of the 5G-1 was 2326. After a final removal of another of 9.9 grams of distillate, the molecular weight of the 5G-1 remaining in the vessel was 2550. This 5G-1 was used to prepare the polyurethaneurea spandex polymer described in the Examples. Substantially the same procedure as just described was used to prepare 6G-1 polycarbonate glycol from 1,6-hexanediol and ethylene carbonate.

To prepare 5G/6G-1 copolymer, the desired ratio of ingredients (e.g., 37.5 grams of 5G-1 and 112.5 grams of 6G-1 for a 25/75 weight ratio of 5G/6G-1) were placed in the vessel. The contents, with "Tyzor" TPT catalyst present, were stirred, swept with nitrogen and heated to 195–200° C. for four hours. A random copolymer resulted.

EXAMPLE 1

This example illustrates the preparation of a yarn from 5G-1:MDI:EDA/HmPD spandex polymer and demonstrates the superior performance of the polycarbonate-based spandex yarn in chlorine durability over a control polyester-based and polyether based spandex control yarns and in mildew resistance over the polyester-based spandex control yarn. The polymer of the polyether-based spandex yarn is PO4G:MDI:EDA/HmPD (designated Control A) and of the polyester-based spandex yarn (Type-128 "Lycra") is 2G/4G-6:MDI:EDA (designated Control B).

To 100.0 grams of 5G-1 of 2550 molecular weight in a 500-ml round bottom, three-neck glass flask, 5 ml of toluene were added. The contents of the flask which was equipped with a thermometer and a stirrer were heated to 115° C. under a gentle flow of argon gas for 30 minutes to assure removal of any possible moisture from the mixture. The contents of the flask were allowed to cool to 60° C. and 17.8 grams of MDI were added. The temperature was then raised to 75° C. and kept at this temperature for 60 minutes to form an isocyanate-capped polycarbonate glycol. The % NCO of the capped polycarbonate glycol was 2.43. Then 115.0 grams of the capped plycarbonate glycol was dissolved in 172.0 grams DMAc, to which was added a mixture of 30.0 grams of 1 molar solution of 80/20 molar ratio of (EDA) and (HmPD) and 2.4 grams of 1 molar solution of diethylamine (DEA) in N,N-dimethylacetamide (DMAc) to effect chain extension and form a viscous polymer solution. The progress of chain extension was followed with a Malachite green internal indicator (which is a greenish-blueish color when isocyanate groups are present and colorless when on amine side). The viscous polymer solution remained colorless, indicating that the required stoichiometry had been reached. Then "Santowhite" powder (SWP), amounting to 1% by weight of the polymer was added. The viscosity of the polymer solution was measured using a brookfield viscometer and was found to be 2900 poise at room temperature.

The polymer solution (30% solids) was then dry spun in a conventional manner into 70-denier/8-filament yarn (Sample 1) at a speed of 150 yards per minute, treated with a conventional finishing agent and wound onto a conventional cardboard tube.

A control yarn, Control A, of the same count as Sample 1, was prepared from a commercially used polyether-based spandex polymer of P04G:MDI:-:EDA/HMPD essentially as described in Example 1 of U.S. Patent No. 3,428,711. A second control yarn, Control B, was prepared from commercially used 2G/4G-6:MDI:EDA polyester-based spandex polymer of the type described above in the mildew resistance test. A comparison of some of the characteristics of Sample 1 and Controls A and B are given in Table I.

TABLE I

| | Sample or Control | | |
| --- | --- | --- | --- |
| | 1 | A | B |
| Spandex composition | | | |
| Soft segment | 5G-1 | PO4G | 2G/4G-6 |
| Diisocyanate | MDI | MDI | MDI |
| Diamine | EDA/HmPD | EDA/HmPD | EDA |
| Durability | | | |
| Chlorine | 2.7 | 1.0 | 1.5 |
| Mildew | 10 | >42 | 2 |
| Tensile properties | | | |
| Tenacity, g/den | 1.3 | 1.8 | 0.8 |
| Elongation, % | 586 | 560 | 710 |

Note the surprisingly large advantage in chlorine durability of the polycarbonate-based spandex yarn according to the invention over the commercial comparison yarns. The polycarbonate-based spandex yarn of the invention (Sample 1) exhibited a chlorine durability that was 270% that of the polyether-based spandex yarn Control A and 180% of that of the polyester-based spandex yarn Control B. With regard to the mildew resistance, note that polyether-based spandex yarns (Control A) do not require any improvement in this characteristic, but that the polyester-based spandex yarns are in need of considerable improvement. In comparison to polyester-based spandex Control B, the polycarbonate-based spandex yarn Sample 1 of the invention exhibited a mildew resistance that was 5 times that of Control B.

EXAMPLE 2

This example illustrates the preparation of a yarn from 5G-1 polycarbonate diol which is capped with an aliphatic diisocyanate (PICM) and then chain extended with a tetra-chlorinated xylylene diamine to form a 5G-1:PICM:TC1pXD spandex. The yarn, designated Sample 2, is compared to control yarns made with the same diisocyanate and diamine but having a polyether-based soft segment (Control C) or a polyester-based soft segment (Control D). The sample and controls are made in the same equipment as was used in Example 1 to prepare Sample 1. Advantages in chlorine and mildew durability of the polycarbonate-based spandex yarn of the invention over the control yarns are summarized in Table II.

To prepare the spandex polymer of Sample 2, first, 5 ml of toluene were added to 100.0 grams of 5G-1 of 2550 number average molecular weight and the mixture was heated to assure removal of all moisture. The 5G-1 was then allowed to cool to 60° C., at which time 18.7 grams of 4,4'-methylene-bis-(cyclohexylisocyanate) (PICM) were added. Then 200 ppm (based on the weight of the contents of the vessel) of dibutyltin dilaurate were added to catalyze the capping reaction. Capping was continued at 75° C. for 90 minutes. The % NCO content of the resulting capped polycarbonate glycol was 2.26.

One-hundred-and-fifteen grams of the capped polycarbonate glycol were then dissolved in 174.0 grams of DMAc. Chain extension was carried out with 0.2 molar tetrachloro-p-xylylenediamine (TC1pXD) in DMAc. Bromophenol Blue indicator was used externally to determine when the stoichiometric end point was reached in the chain extension step. A total of 167.0 grams of TC1PXD solution was added in increments to reach the desired end point. Then, 1% of SWP (based on weight of polymer) was added. Room temperature viscosity of the polymer solution, as measured with a Brookfield Viscometer, was 3500 poise.

The polymer solution, which contained 25% solids, was dry spun in a conventional manner into 70-denier/8-filament yarn at 150 yards per minute and treated to form Sample 2. A conventional finish was applied and the yarn was wound onto a conventional cardboard tube.

The P04G:PICM:TC1pXD spandex polymer for Control C was prepared as follows. To 100.0 grams of P04G of 1800 molecular weight, 5 ml of toluene were added and the mixture was heated to assure removal of all moisture. After cooling the contents of the flask to 60° C., 23.3 grams of PICM were added, followed by 200 ppm (based on the contents of the flask) of the same catalyst as was used in Example 1. The temperature was raised to and maintained at 75° C. for 60 minutes. The resulting isocyanate-capped polyether glycol had an NCO content 2.01%. One-hundred-and-sixteen grams of the capped polyether glycol were then dissolved in 194 grams of DMAc and chain extension was carried out with a 0.2 molar TC1PXD solution in DMAc. Bromophenol Blue indicator was used externally to determine when the stoichiometric end point was reached. A total of 143 grams TC1PXD solution was used to reach the desired end point. Then, 3 ml of 1 molar DEA as a chain terminator and 1% of SWP (based on polymer weight) as a thermal stabilizer were added. The solution was diluted with 50.0 grams of DMAc. The diluted solution had a viscosity of 3760 poise.

The 2G/4G-6:PICM:TC1pXD spandex polymer for Control D was prepared as follows. To 100.0 grams of 2G/4G-6 of 3,400 molecular weight, 5 ml of toluene were added and the mixture was heated to assure removal of all moisture. After cooling the contents of the flask to 60° C., 14.0 grams of PICM were added, followed by 200 ppm of the same catalyst as used for Samples 1 and 2. The temperature was raised to and maintained at 75° C. for 90 minutes. The resulting isocyanate-capped polyester diol had an NCO content of 1.75%. One-hundred-and-ten grams of the capped polyester glycol were dissolved in 174.0 grams of DMAc and chain extension was carried out with 0.2 TC1pXD solution in DMAc. The stoichiometric end point, determined as in the preceding paragraph, required a total of 129 grams of TC1pXD solution. Then, 1 ml of 1 molar DEA was added as a chain terminator, followed by 1% of SWP as a thermal stabilizer. The solution was then diluted with 50.0 grams of DMAc. The solution viscosity was 6,850 poise.

The polymer solutions for Controls C and D were dry spun in substantially the same manner as the test yarn of Sample 2, to form yarns of the same count.

Characteristics of the yarns of Sample 2 and Controls C and D are compared in Table II below.

TABLE II

| | Sample or Control | | |
|---|---|---|---|
| | 2 | C | D |
| Spandex composition | | | |
| Soft segment | 5G-1 | PO4G | 2G/4G-6 |
| Diisocyanate | PICM | PICM | PICM |
| Diamine | TClpXD | TClpXD | TClpXD |
| Durability | | | |
| Chlorine | 13 | 3 | 9.7 |
| Mildew | 32 | >42 | 10 |
| Tensile properties | | | |
| Tenacity, g/den | 1.3 | 1.9 | 1.2 |
| Elongation, % | 551 | 600 | 608 |

Note again, as in Example 1, the surprisingly large advantage in chlorine durability of the polycarbonate-based spandex yarn according to the invention (Sample 2) over the comparison yarns (Controls C and D). The polycarbonate-based spandex yarn of the invention exhibited a chlorine durability that was 433% that of polyether-based spandex Control C and 134% of that of polyester-based spandex Control D. With regard to mildew resistance, in comparison to polyester-based spandex Control D, the polycarbonate-based spandex yarn of Sample 2 of the invention exhibited a mildew resistance that was 3.2 times that of Control D.

EXAMPLE 3

A polymer of 6G-1(2213 mw):MDI:EDA/HmPD(80/20) and a polymer of 5G/6G-1(40/60):MDI:EDA/HmPD(85/15) were made by the general methods described in Example 1. The polymers were dry-spun substantially as described in the preceding examples. Yarn of these spandexes with polycarbonate soft-segments had satisfactory elastic and tensile properties, had good resistance to mildew and hydrolysis, had outstanding UV stability, and were much superior to commercial control yarns of P04G:MDI:2/HMPD in chlorine resistance.

The preceding examples and other laboratory tests have shown that spandex fibers having polycarbonate soft segments according to the present invention, such as 5G-1, and containing an aromatic-based diisocyanate (e.g., MDI) or an aliphatic-based diisocyanate (e.g., PICM, p-TMXDI) are more resistant to chlorine degradation than similar spandex fibers with a polyester soft segment (e.g., 2G/4G-6) or with a polyether soft segment. Best results with regard to resistance to chlorine are obtained in spandexes wherein the polycarbonate soft segment is coupled with aliphatic diisocyanates to highly ring chlorinated diamines (e.g., TClpXD). The spandex filaments of the invention consistently show a superiority in mildew resistance over polyester-based spandex filaments.

I claim:

1. An improved fiber formed from a linear, segmented polyurethane-urea spandex polymer which is produced by reacting a hydroxyl-terminated polymer with an organic diisocyanate to form an isocyanate-terminated polymer, which is then chain extended with a diamine and the thusly produced spandex polymer is then formed into a fiber, wherein, to provide the fiber with increased resistance to chlorine and mildew, the improvement comprises, in combination, the hydroxyl-terminated polymer being a polycarbonate selected from the group consisting of poly(pentane-1,5-carbonate)diol, poly(hexane-1,6-carbonate)diol, and copolymers or mixtures thereof, the organic diisocyanate being selected from the group consisting of p,p'-methylene diphenyl diisocyanate, 4,4'-methylene-bis(cyclohexylisocyanate), α,α,α',α',-tetramethyl p-xylylene diisocyanate, α,α,α',α',-tetramethyl m-xylylene diisocyanate and mixtures thereof and the chain-extending diamine being selected from the group consisting of hydrazine and diamines of the formula $H_2N-R-NH_2$, wherein R has 2 to 8 carbon atoms and is an alkylene group, an alicyclic group, a tetrachloro-substituted xylylene group and mixtures thereof.

2. A fiber in accordance with claim 1 wherein the diamine is a mixture of ethylenediamine and hydrogenated m-phenylenediamine, the ethylenediamine amounting to at least 70% by weight of the mixture.

3. A fiber in accordance with claim 1 wherein the diol has a number average molecular weight in the range of 800 to 5,000 and a melting point no higher than 50° C.

4. A fiber in accordance with claim 1, 2 or 3 wherein the hydroxyl-terminated polycarbonate polymer is a poly(pentane-1,5-carbonate)diol.

* * * * *